United States Patent
Sawata et al.

(10) Patent No.: US 11,468,884 B2
(45) Date of Patent: Oct. 11, 2022

(54) METHOD, APPARATUS AND COMPUTER PROGRAM FOR DETECTING VOICE UTTERED FROM A PARTICULAR POSITION

(71) Applicant: Sony Corporation, Tokyo (JP)

(72) Inventors: Ryosuke Sawata, Kanagawa (JP); Yuichiro Koyama, Tokyo (JP)

(73) Assignee: Sony Corporation, Tokyo (JP)

( * ) Notice: Subject to any disclaimer, the term of this patent is extended or adjusted under 35 U.S.C. 154(b) by 95 days.

(21) Appl. No.: 16/610,145

(22) PCT Filed: Mar. 13, 2018

(86) PCT No.: PCT/JP2018/009662
§ 371 (c)(1),
(2) Date: Nov. 1, 2019

(87) PCT Pub. No.: WO2018/207453
PCT Pub. Date: Nov. 15, 2018

(65) Prior Publication Data
US 2020/0074998 A1  Mar. 5, 2020

(30) Foreign Application Priority Data

May 8, 2017 (JP) .............................. JP2017-092122

(51) Int. Cl.
*G10L 21/0272* (2013.01)
*G10L 21/0308* (2013.01)
(Continued)

(52) U.S. Cl.
CPC .............. *G10L 15/20* (2013.01); *G10L 15/22* (2013.01); *G10L 17/00* (2013.01); *G10L 25/78* (2013.01); *G10L 2015/223* (2013.01)

(58) Field of Classification Search
CPC ......... G10L 15/20; G10L 15/22; G10L 21/02; G10L 21/0216; G10L 21/0727;
(Continued)

(56) References Cited

U.S. PATENT DOCUMENTS 6,041,301 A * 3/2000 Fado ...................... G10L 15/26
704/270
6,525,993 B2 * 2/2003 Wake ..................... G01S 3/8083
367/125
(Continued)

FOREIGN PATENT DOCUMENTS

JP  2002-312796 A  10/2002
JP  2007-318528 A  12/2007
(Continued)

OTHER PUBLICATIONS

Wikipedia, "Eigendecomposition of a matrix", 14 Pages, downloaded Feb. 2, 2022. (Year: 2022).*
(Continued)

*Primary Examiner* — Martin Lerner
(74) *Attorney, Agent, or Firm* — Wolf, Greenfield & Sacks, P.C.

(57) ABSTRACT

An information processing apparatus includes a voice acquisition section, a reliability generation section, and a processing execution section. The voice acquisition section acquires an ambient voice. The reliability generation section generates reliability indicating a degree in which the acquired voice is uttered from the particular position on the basis of a predetermined transfer characteristic. As the predetermined transfer characteristic, a phase difference or acoustic characteristic of the voice can be assumed. The processing execution section executes a process according to the generated reliability. As the process according to the reliability,
(Continued)

a notification according to the reliability or a predetermined command can be assumed to be executed.

12 Claims, 10 Drawing Sheets

(51) Int. Cl.
*G01S 3/80* (2006.01)
*G10L 15/20* (2006.01)
*G10L 15/22* (2006.01)
*G10L 25/78* (2013.01)
*G10L 17/00* (2013.01)

(58) Field of Classification Search
CPC ... G10L 2021/0216; G10L 2021/02166; G10L 21/028; G10L 21/0232; G10L 21/0308; G10L 21/0272; G01S 3/80; H04R 3/005; H04R 2430/20; H04R 2430/21
USPC .......... 704/231, 233, 236, 270, 275; 381/92, 381/110, 356; 367/118
See application file for complete search history.

(56) References Cited

U.S. PATENT DOCUMENTS

| | | | |
|---|---|---|---|
| 8,438,023 B1* | 5/2013 | Hamilton | G10L 15/22 704/233 |
| 8,774,952 B2* | 7/2014 | Kim | G10K 11/178 381/71.11 |
| 9,007,477 B2* | 4/2015 | Ojala | H04N 5/23222 348/211.99 |
| 9,641,928 B2* | 5/2017 | Tanaka | H04R 3/005 |
| 10,306,359 B2* | 5/2019 | Sekiya | G10L 15/20 |
| 2003/0097257 A1* | 5/2003 | Amada | G10L 21/0208 704/208 |
| 2004/0013252 A1* | 1/2004 | Craner | H04M 15/06 379/142.01 |
| 2007/0038444 A1* | 2/2007 | Buck | B60R 16/0373 704/235 |
| 2007/0274536 A1 | 11/2007 | Matsuo | |
| 2008/0167869 A1* | 7/2008 | Nakadai | G10L 15/20 704/233 |
| 2009/0018828 A1* | 1/2009 | Nakadai | G10L 21/028 704/234 |
| 2009/0097670 A1* | 4/2009 | Jeong | H04R 3/005 381/73.1 |
| 2010/0070274 A1* | 3/2010 | Cho | G10L 15/20 704/233 |
| 2012/0063620 A1* | 3/2012 | Nomura | G01S 3/803 381/316 |
| 2012/0163624 A1* | 6/2012 | Hyun | H04R 3/005 381/92 |
| 2013/0218559 A1* | 8/2013 | Yamabe | G10L 21/0216 704/226 |
| 2014/0056435 A1* | 2/2014 | Kjems | G10L 21/0232 381/317 |
| 2015/0226831 A1* | 8/2015 | Nakamura | G01S 3/801 367/118 |
| 2015/0264483 A1* | 9/2015 | Morrell | G10L 19/08 381/300 |
| 2015/0358750 A1 | 12/2015 | Choi et al. | |
| 2016/0073198 A1* | 3/2016 | Vilermo | G10L 21/028 381/26 |
| 2016/0203828 A1* | 7/2016 | Gomez | G10L 15/20 704/226 |
| 2016/0365100 A1* | 12/2016 | Helwani | G10L 21/0208 |
| 2016/0372129 A1* | 12/2016 | Nakadai | G10L 21/028 |
| 2017/0048498 A1* | 2/2017 | Yook | H04N 5/23296 |
| 2017/0164101 A1* | 6/2017 | Rollow, IV | H04R 3/04 |
| 2017/0374454 A1* | 12/2017 | Bernardini | H04R 1/406 |
| 2018/0286431 A1* | 10/2018 | Cutler | G06F 3/165 |
| 2018/0366136 A1* | 12/2018 | Shi | G10L 25/18 |
| 2019/0250245 A1* | 8/2019 | Koyama | G01S 5/30 |

FOREIGN PATENT DOCUMENTS

| | | | | |
|---|---|---|---|---|
| WO | WO 2006-059806 A1 | | 6/2006 | |
| WO | WO 2011/095913 | * | 8/2011 | ............ H04S 3/00 |
| WO | WO 2016-063587 A1 | | 4/2016 | |
| WO | WO 2016/0133785 | * | 8/2016 | ......... G10L 21/028 |
| WO | WO 2017/065092 | | 4/2017 | |

OTHER PUBLICATIONS

International Search Report and Written Opinion and English translations thereof dated Jun. 5, 2018 in connection with International Application No. PCT/JP2018/009662.
International Preliminary Report on Patentability and English translation thereof dated Nov. 21, 2019 in connection with International Application No. PCT/JP2018/009662.

* cited by examiner a b c a b

METHOD, APPARATUS AND COMPUTER PROGRAM FOR DETECTING VOICE UTTERED FROM A PARTICULAR POSITION

CROSS-REFERENCE TO RELATED APPLICATIONS

This application claims the benefit under 35 U.S.C. § 371 as a U.S. National Stage Entry of International Application No. PCT/JP2018/009662, filed in the Japanese Patent Office as a Receiving Office on Mar. 13, 2018, which claims priority to Japanese Patent Application Number JP2017-092122, filed in the Japanese Patent Office on May 8, 2017, each of which is hereby incorporated by reference in its entirety.

TECHNICAL FIELD

The present technology relates to an information processing apparatus. More specifically, the present technology relates to an information processing apparatus that performs a process according to an acquired voice and a processing method for the apparatus, and a program for causing a computer to execute the method.

BACKGROUND ART

In a voice detection technology in related art, on the basis of a periodic structure of a human voice, whether or not a sound is a voice is determined and a voice segment is detected. For example, there is proposed a technique in which gain information is obtained on the basis of power and periodicity information indicating periodicity of an input signal and the periodicity information of a noise addition signal obtained by adding noise of magnitude according to the gain information to the input signal is used as a characteristic amount of the input signal, and the voice segment is detected (for example, see PTL 1). In this case, to identify a speaker from a voice, it is necessary to detect a direction of a sound source. For that purpose, for example, there is proposed a conference voice recording system that identifies a speaker of each speech on the basis of a speaker's acoustic characteristic amount in a speech voice at a meeting, direction information, and the like (for example, see PTL 2).

CITATION LIST

Patent Literature

[PTL 1]
Japanese Patent Laid-Open No. 2007-328228
[PTL 2]
Japanese Patent Laid-Open No. 2009-301125

SUMMARY

Technical Problems

In the above-described technology in related art, there are problems that all sound source directions are required to be inspected and then detected in order to recognize speakers and therefore an amount of calculation increases. In recent years, a wearable device that is worn on a part of a body by a user is used. In a case in which a voice input is used as a user interface thereof, the amount of calculation necessary for a process is required to be low. Further, it is considered that a speaker is previously registered and an individual matching is performed. However, a registration work is complicated and a change in voices due to a physical condition of a speaker or an accuracy due to a voice variation becomes problematic.

The present technology has been made in view of such circumstances and it is an object of the present technology to detect a voice uttered from a particular position with a small amount of calculation.

Solution to Problems

The present technology is performed in order to solve the above-described problems. According to a first aspect of the present technology, there is provided an information processing apparatus including a voice acquisition section configured to acquire an ambient voice, a reliability generation section configured to generate reliability indicating a degree in which the acquired voice is uttered from a particular position on the basis of a predetermined transfer characteristic, and a processing execution section configured to execute a process according to the reliability. Thereby, there is brought an action that the reliability in which the voice is uttered from the particular position is generated on the basis of the transfer characteristic and a process is executed in accordance with the reliability.

Further, according to the first aspect of the present technology, the voice acquisition section may include a plurality of microphones, and the reliability generation section may generate the reliability on the basis of a phase difference of the voice acquired by the plurality of microphones as the predetermined transfer characteristic. Thereby, there is brought an action that the reliability is generated by using the phase difference of the voice as the transfer characteristic. In this case, it is preferable that at least a part of the plurality of microphones are arranged in the vicinity of the particular position. In addition, it is preferable that any one pair of the plurality of microphones is arranged at the particular position in an opposed manner to each other.

Further, according to the first aspect of the present technology, the reliability generation section may generate the reliability on the basis of an acoustic characteristic of the voice acquired by the voice acquisition section as the predetermined transfer characteristic. Thereby, there is brought an action that the reliability is generated by using the acoustic characteristic of the voice as the transfer characteristic.

Further, according to the first aspect of the present technology, the processing execution section may perform a notification according to the reliability. Thereby, an action that the notification is performed in accordance with the reliability is brought. In this case, the processing execution section may perform the notification indicating whether or not the voice is uttered from the particular position. Further, the processing execution section may perform the notification that whether or not the voice is uttered from the particular position is incapable of being determined. In addition, in a case in which the information processing apparatus is a mounting type terminal, the processing execution section may perform the notification regarding a wearing condition.

Further, according to the first aspect of the present technology, in a case in which the voice is uttered from the particular position, the processing execution section may execute a predetermined command.

Advantageous Effect of Invention

According to the present technology, it is possible to exert an excellent advantageous effect that a voice uttered from a particular position can be detected with a small amount of calculation. In addition, advantageous effect disclosed herein are not necessarily limited thereto and may be any advantageous effect disclosed during the present disclosure.

DESCRIPTION OF EMBODIMENT

Hereinafter, mode (hereinafter referred to as embodiment) for carrying out the present technology will be described below. The description will be given in the following order.
1. System Configuration
2. Sound Source Estimation Process
3. Application Example
<1. System Configuration>
[Information Processing System]

Figure 1:
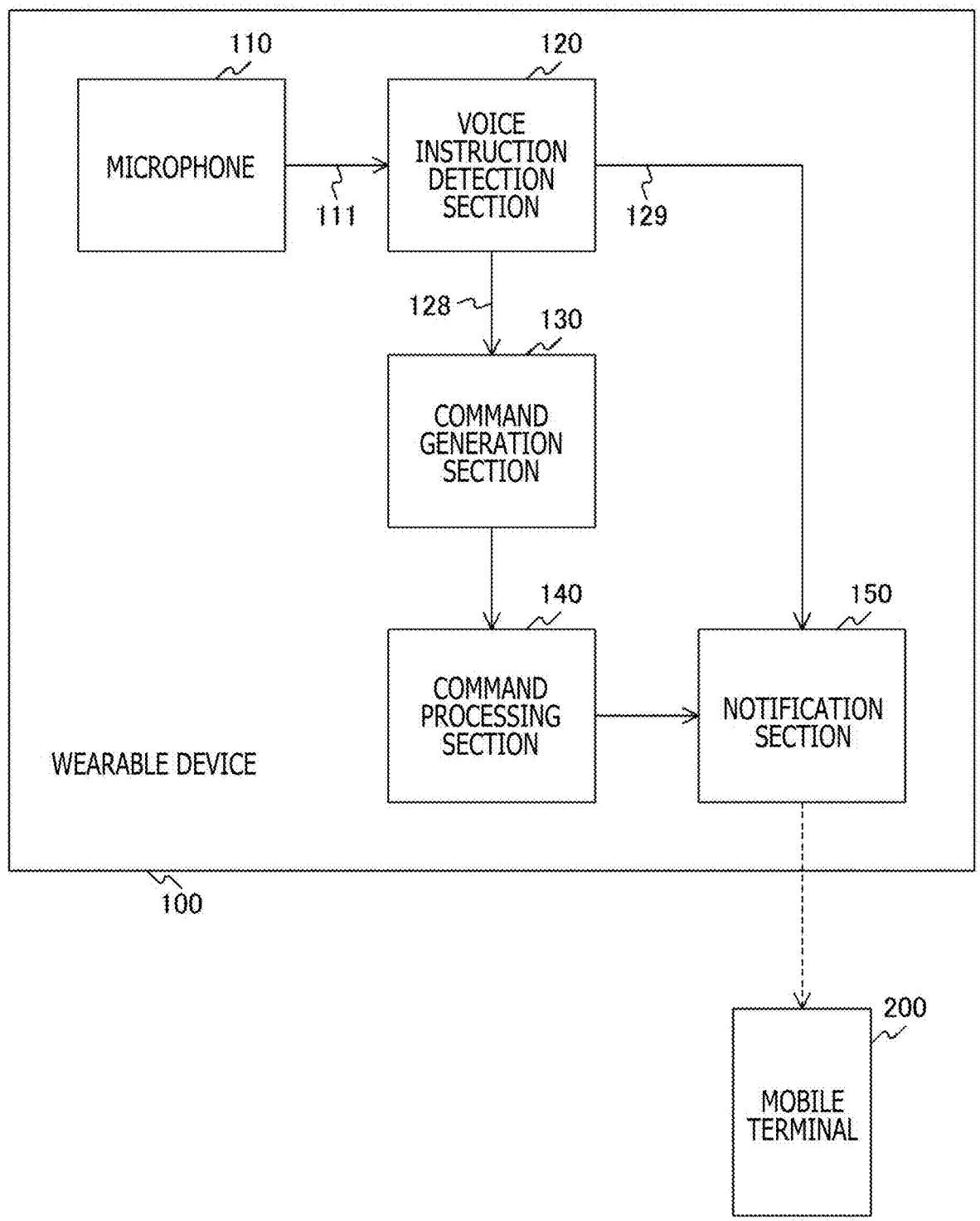
FIG. 1 is a diagram illustrating a configuration example of an information processing system according to an embodiment of the present technology.

FIG. 1 is a diagram illustrating a configuration example of an information processing system according to an embodiment of the present technology. The information processing system includes a wearable device 100 and a mobile terminal 200. The wearable device 100 is a device that is worn on a part of a user's body. The user who wears the wearable device 100 is referred to as a wearer. The mobile terminal 200 is a terminal apparatus that is carried by the user. The wearable device 100 and the mobile terminal 200 are assumed to be connected through wireless communication for use. For example, the wearable device 100 and the mobile terminal 200 are connected with pairing by Bluetooth (registered trademark).

The wearable device 100 includes a microphone 110, a voice instruction detection section 120, a command generation section 130, a command processing section 140, and a notification section 150.

The microphone 110 is an apparatus that converts a voice into an electrical signal and is used to acquire ambient voices. The voices that are converted into electrical signals are supplied to the voice instruction detection section 120 through a signal line 111. The microphone 110 may include one or a plurality of microphones. In a case in which the plurality of microphones are used, the voices that are supplied through the signal line 111 are changed to a plurality of channels of signals. Note that the microphone 110 is one example of a voice acquisition section as defined in claims.

The voice instruction detection section 120 detects a voice instruction by the wearer from among voices acquired by the microphone 110. The voice instruction is used as a voice user interface. In a case in which the voice instruction by the wearer is detected, the voice instruction detection section 120 supplies contents of the voice instruction to the command generation section 130 through a signal line 128. Further, the voice instruction detection section 120 generates a reliability indicating a degree in which the voice acquired by the microphone 110 is uttered from a particular position and supplies the reliability to the notification section 150 through a signal line 129.

The command generation section 130 generates a command in accordance with the contents of the voice instruction supplied from the voice instruction detection section 120 through the signal line 128. Specifically, the command is generated through the voice user interface based on the voice instruction. The command processing section 140 executes the command generated by the command generation section 130. The command processing section 140 notifies the mobile terminal 200 of execution results thereof via the notification section 150, if necessary.

The notification section 150 performs a notification in accordance with the reliability generated by the voice instruction detection section 120. It is assumed that examples of the notification by the notification section 150 include a notification indicating whether or not voices are uttered from the wearer, a notification regarding a wearing condition, a notification of the above-described execution result of the command processing section 140, and the like.

Note that the command processing section 140 and the notification section 150 are one example of a processing execution section as defined in claims.

[Voice Instruction Detection Section]

Figure 2:
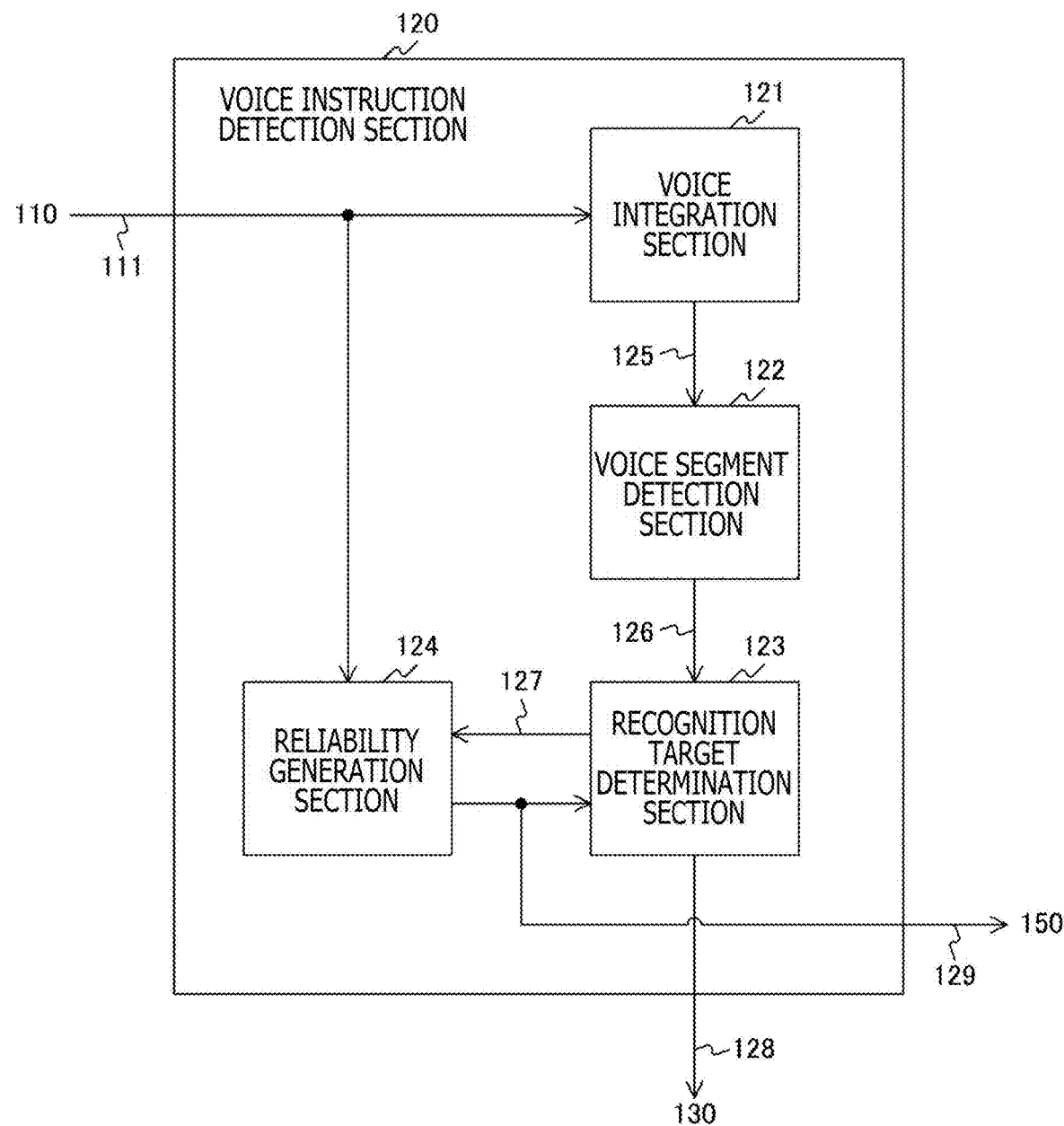
FIG. 2 is a diagram illustrating a configuration example of a voice instruction detection section 120 according to the embodiment of the present technology.

FIG. 2 is a diagram illustrating a configuration example of the voice instruction detection section 120 according to the embodiment of the present technology. The voice instruction detection section 120 includes a voice integration section 121, a voice segment detection section 122, a recognition target determination section 123, and a reliability generation section 124.

In a case in which the voices supplied through the signal line 111 are changed to the plurality of channels of signals, the voice integration section 121 integrates the plurality of channels of signals into one channel signal. The one channel signal integrated by the voice integration section 121 is supplied to the voice segment detection section 122 through a signal line 125.

The voice segment detection section 122 detects a voice segment in the one channel signal supplied from the voice integration section 121 through the signal line 125. The voice segment is a section in which a voice is uttered and a detection of the voice segment is referred to as a VAD (Voice Activity Detection). The voice segment detection section 122 generates voice likelihood representative of voice likeness in the one channel signal supplied from the voice integration section 121. Further, the voice segment detection section 122 detects a time segment in which a possibility of the voice derived from the wearer is in excess of a predetermined threshold, as the voice segment. When detecting the voice segment, the voice segment detection section 122 supplies a voice in the voice segment to the recognition target determination section 123 through a signal line 126.

When the voice segment is detected and a voice in the voice segment is supplied in the voice segment detection section 122, the recognition target determination section 123 determines whether or not a recognition target is included in the voice segment. For example, it is assumed that examples of the recognition target include a start word such as "OK" or "hello." When detecting that the recognition target is included in the voice segment, the recognition target determination section 123 notifies the reliability generation section 124 of the above through a signal line 127. In the result, in the case in which the reliability generated by the reliability generation section 124 is higher than a predetermined threshold, the recognition target determination section 123 supplies a voice in the voice segment to the command generation section 130 through the signal line 128.

When receiving a notification that the recognition target is included in the voice segment from the recognition target determination section 123, the reliability generation section 124 generates the reliability indicating a degree in which the voice supplied through the signal line 111 is uttered from a particular position. The reliability generation section 124 generates the reliability on the basis of a transfer characteristic of a voice. As described below, a phase difference due to arrival times of a plurality of voices or a characteristic of amplitude (acoustic characteristic) of voices can be used for the transfer characteristic. On the basis of the transfer characteristic, the reliability generation section 124 generates the reliability and outputs the reliability to the recognition target determination section 123 and the notification section 150 through the signal line 129.

<2. Sound Source Estimation Process>

[MUSIC Method]

Figure 3:
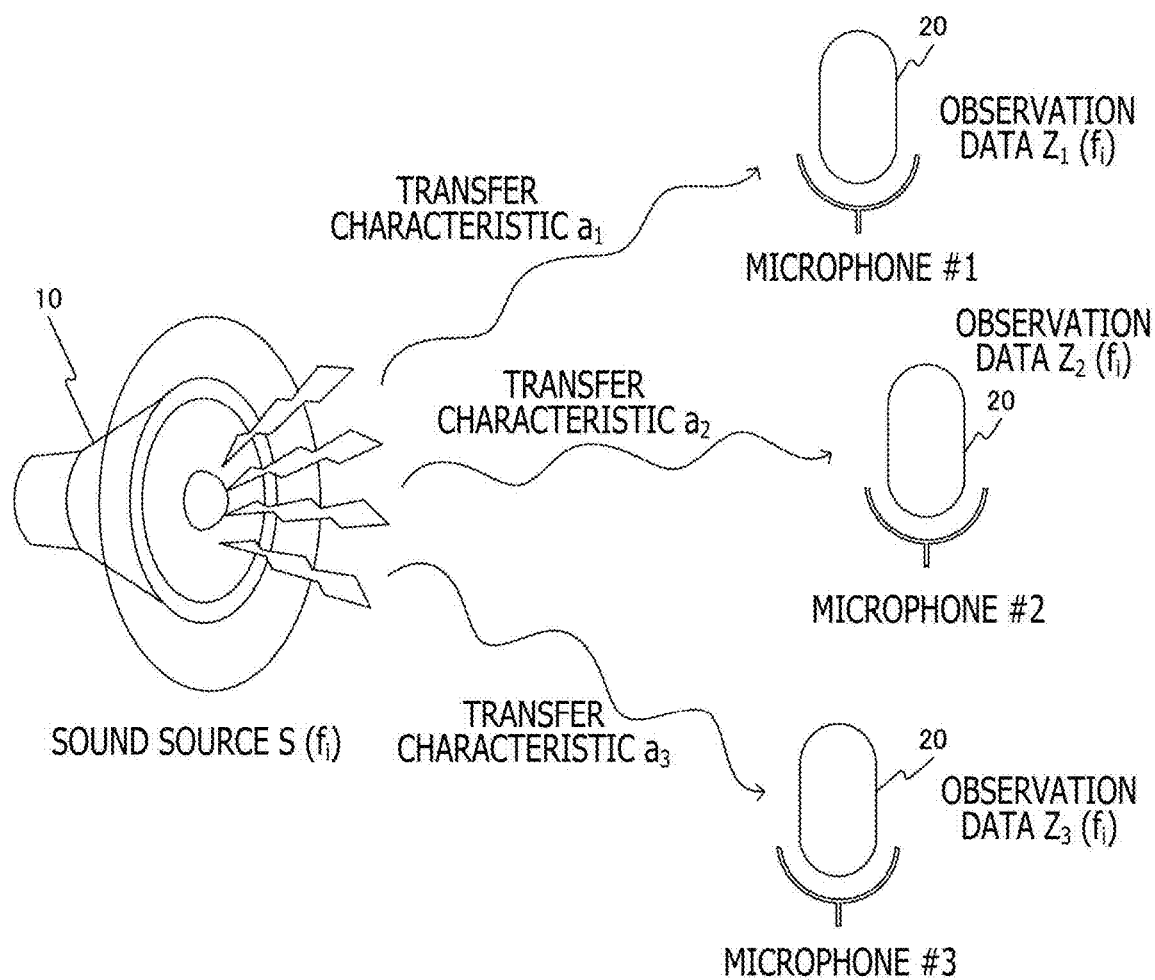
FIG. 3 is a diagram illustrating one example of a propagation model of a voice.

FIG. 3 is a diagram illustrating one example of a propagation model of a voice. Here, a premised MUSIC method in related art will be described. The MUSIC (MUltiple SIgnal Classification) method is a method in which a phase difference between a plurality of microphones is analyzed in an eigenspace to thereby perform a sound source localization. Generally, the sound source localization is a technique in which a difference or the like of sound waves observed by each microphone is used to thereby identify a position of a sound source in equipment on which a plurality of microphones are mounted. Here, it is assumed that M (M is an integer greater than one) microphones 20 and N (N is an integer smaller than M) sound sources 10 are present in a space. Further, it is considered that sound waves propagated by the above are measured.

At this time, when a delay of a propagational wave in an m-th (m is an integer of any one of 1 to M) microphone is represented as $\tau_m$, an observation signal $z_m(t)$ by each microphone at time t is represented by the following formula. Note that s(t) represents a sound source signal at the time t.

$$z(t) = \begin{bmatrix} z_1(t) \\ z_2(t) \\ \vdots \\ z_M(t) \end{bmatrix} = \begin{bmatrix} s(t-\tau_1) \\ s(t-\tau_2) \\ \vdots \\ s(t-\tau_M) \end{bmatrix} \quad \text{[Math. 1]}$$

Further, a Fourier transformation is performed on the above formula and thereby a Fourier spectrum regarding an arbitrary frequency fi represented by the following formula is obtained. Note that $Z_m(f_i)$ represents a result obtained by performing a Fourier transformation on $s(t-\tau_m)=z_m(t)$.

$$z(f_i) = \begin{bmatrix} Z_1(f_i) \\ Z_2(f_i) \\ \vdots \\ Z_M(f_i) \end{bmatrix} \quad \text{[Math. 2]}$$

At this time, when a Fourier spectrum of the sound source signal is represented as S(fi) and a transfer function of a path until the sound source reaches each microphone is represented as am, the above formula can be rewritten as in the following formula. Generally, $a_{fi}$ is referred to as an array manifold vector and a matrix $A=[a_1, a_2, \ldots, a_N]$ in which the array manifold vector regarding each sound source is arranged is referred to as an array manifold matrix. Note that the array manifold vector $a_{fi}$ has complex numbers of M dimensions and the array manifold matrix A has complex numbers of M×N dimensions.

$$z(f_i) = \begin{bmatrix} a_1 \\ a_2 \\ \vdots \\ a_M \end{bmatrix} \cdot S(f_i) = a_{fi} S(f_i) \quad \text{[Math. 3]}$$

Here, with regard to a vector (hereinafter, referred to as an observation vector) in which an observation signals are arranged in a frequency area, a covariance matrix is calculated in each frame of a voice signal. Further, a frame average is calculated as in the following formula to thereby obtain a spatial correlation matrix R regarding the frequency fi. Note that the spatial correlation matrix R has complex numbers of M×M dimensions. Further, $z_n(f_i)$ is an observation vector obtained by performing a Fourier transformation, at the frequency $f_i$, on a signal in a frame # n obtained by dividing observation signals into F frames.

$$R = \frac{1}{F}\sum_{n=1}^{F} z_n(f_i) \cdot z_n^H(f_i) \quad \text{[Math. 4]}$$

The obtained spatial correlation matrix R is a statistical amount representative of a spatial property of a sound source, which has a power spectrum observed by each microphone as a diagonal component and a spatial power correlation between microphones as another factor. In the MUSIC method, with regard to the spatial correlation matrix R, an eigenvector $e_m$ and eigenvalue $\lambda_m$ satisfying the following formula are calculated and thereby discussions from a frequency area to an eigenspace are developed.

$$R \cdot e_m = \lambda_m \cdot e_m$$

The above formula is the same as that of a generalized eigenvalue problem finally solved by a PCA (Principle Component Analysis) that performs maximization of the covariance matrix. Accordingly, the fact that an eigenvector of the spatial correlation matrix is calculated has the same meaning as that of the fact that the eigenspace is searched for an axis indicating an observed sound wave in an optimum manner as small amount of information as possible. For that purpose, under an ideal and clean environment, an eigenvalue corresponding to the eigenvector indicating a more dominant sound source is calculated for the number of sound sources in descending order and the eigenvalue of "the number of the sound sources+1" or later is equal to zero.

Generally, a space that is spanned by each column vector of the matrix A in which a transfer path up to each sound source is arranged is referred to as a signal subspace in a subspace method. At this time, the space that is spanned by eigenvectors of the numbers of sound sources calculated by the above formula in descending order of the eigenvalues is an orthonormal base of the signal subspace. Further, the space that is spanned by the eigenvector of "the number of the sound sources+1" or later in descending order of the eigenvalue is referred to as a noise subspace. On the base of a property of the orthonormal base of the eigenvector, the signal subspace and the noise subspace have a relationship of an orthogonal complementary space.

In the MUSIC method, based on the above-described orthogonality between the signal subspace and the noise subspace, a matrix $E=[e_{N+1}, e_{N+1}, \ldots, e_M]$ in which an eigenvector corresponding to the noise subspace is arranged is used, and a spatial spectrum defined by the following formula is used. In this manner, a direction $\theta$ in which a sound source exists is estimated. Note that the matrix E has complex numbers of M×(M−N) dimensions. Further, $a(\theta)$ represents a virtual array manifold vector in a case in which a sound source is assumed to exist in the direction $\theta$.

$$P_{MU}(\theta) = (a^H(\theta) \cdot a(\theta))/(a^H(\theta) \cdot E \cdot E^H \cdot a(\theta))$$

When the above formula is evaluated in the direction $\theta$, a denominator of the above formula is equal to zero in a direction in which a sound source exists really on the basis of the orthogonality between the noise subspace and the signal subspace. Specifically, a spatial spectrum $P_{MU}(\theta)$ has an extremely large value and a peak. In the MUSIC method, a peak of the spatial spectrum $P_{MU}(\theta)$ is searched for as described above to thereby realize a sound source localization.

[Array Manifold Vector Measurement of Voice from Particular Position]

It is known that the above-described MUSIC method generally has a high spatial resolution and performance in comparison with other methods for the sound source localization. However, in a case in which the MUSIC method is applied to the wearable device, the wearable device is incapable of mounting resources for sufficient calculations in many cases. Further, in terms of calculation amount, it is undesirable that a peak search by eigenvalue decomposition is performed in all directions. Further, the wearable device is used in various environments. Therefore, a value varies largely even in a "peak" depending on a difference of background noises at that time or a frequency band to be used, and therefore it may be difficult to identify the peak.

To solve the problem, there will be described below a new method in which search in all directions is not performed by using only a direction of the wearer as an analysis target based on the fact that a positional relationship between the wearer and the microphones is substantially constant. According to the method, the search in all directions is not performed to thereby reduce the calculation amount. Further, a weighted normalization according to the contribution rate of the signal subspace is performed on the spatial spectrum $P_{MU}(\theta)$ defined in the MUSIC method in each frequency band. The process permits the reliability generation section 124 to output the reliability.

First, in a frequency area in which a discrete Fourier transformation is performed, a spatial spectrum value defined by the following formula is considered to be calculated in an arbitrary frequency $f_j$ (j is an integer from 1 to J). Note that J is a total number of the frequency bins. Here, $e_i$ represents an i-th eigenvector obtained by decomposing the eigenvalue. Further, $a_{wear}$ is a value of the array manifold vector in which a transfer distance from a mouth of the wearer to the microphone is assumed to be known. Further, $\phi_i$ represents an angle formed between $a_{wear}$ and $e_i$.

$$P(f_j) = \frac{a_{wear}^H a_{wear}}{\sum_{i=N+1}^{M} |a_{wear}^H e_i|^2} = \frac{a_{wear}^H a_{wear}}{\sum_{i=N+1}^{M} \|\|a_{wear}\| \cos \phi_i|^2} \quad [\text{Math. 5}]$$

At this time, the above formula can be developed as illustrated in the following formula.

$$P(f_j) = \frac{\|a_{wear}\|^2}{\|a_{wear}\|^2 \cos^2 \phi_{N+1} + \|a_{wear}\|^2 \cos^2 \phi_{N+2} + \ldots + \|a_{wear}\|^2 \cos^2 \phi_M} = \frac{1}{\sum_{i=N+1}^{M} \cos^2 \phi_i} \quad [\text{Math. 6}]$$

Here, a denominator of the final P ($f_j$) takes a value in a closed section of [0, (M−N)]. Accordingly, by using an inverse number $P^{-1}$ ($f_j$) thereof, an evaluation function in an arbitrary frequency $f_j$ is defined in accordance with the following formula.

$$E(f_j) = P^{-1}(f_j)/(M-N) \quad (0 \leq E(f_j) \leq 1)$$

Next, the evaluation function E defined in the above formula is integrated as an evaluation function $E_{all}$ in accordance with the following formula while giving weight to all the frequency bins to be used.

$$E_{all} = \frac{1}{\sum_j w_j} \sum_j \{w_j E(f_j)\} \quad (0 \leq E_{all} \leq 1) \quad [\text{Math. 7}]$$

Note that $w_j$ is a weight based on a contribution rate in which a signal subspace occupies the whole subspace and is defined by the following formula. Here, $\lambda^i_j$ is an i-th eigenvalue that is sorted in descending order when the eigenvalue decomposition is performed on an arbitrary frequency $f_j$.

$$w_j = \frac{\sum_{i=1}^{N} \lambda^i_j}{\sum_{i=1}^{M} \lambda^i_j} \quad [\text{Math. 8}]$$

The evaluation function $E_{all}$ obtained as described above is an evaluation function that indicates that a possibility that a voice is uttered from a particular position is higher as a value thereof is nearer to zero. Specifically, when a position of the wearer's mouth is a particular position, the evaluation function $E_{all}$ is an evaluation function that indicates a possibility that the voice is derived from the wearer. The reliability generation section 124 according to the present embodiment generates the above-described reliability on the basis of the evaluation function. According to the method, only the eigenvalue decomposition regarding the array manifold vector $a_{wear}$ of the wearer is performed without performing the peak identification. Therefore, the calculation amount is reduced in comparison with that for searching all directions. Further, the finally used evaluation function $E_{all}$ calculates an output value of a closed section [0, 1] and therefore it is possible to easily determine a threshold.

<3. Application Example>

[Specific Example of Wearable Device]

Figure 4:
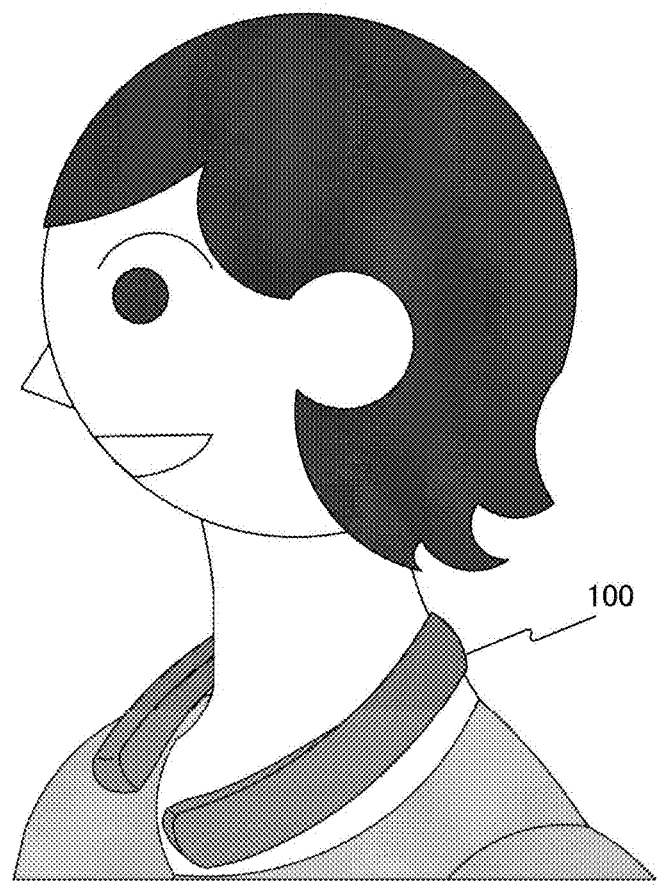
FIG. 4 is a diagram illustrating a specific example of a wearable device 100 according to the embodiment of the present technology.

FIG. 4 is a diagram illustrating a specific example of the wearable device 100 according to the embodiment of the present technology. Here, as the wearable device 100, there is illustrated a neckband-type wearable device that is assumed to be used when hung on a portion of the wearer's neck. The wearable device 100 has a ring shape in which a portion of a ring is opened.

The wearable device 100 includes the microphone 110 as described above and acquires ambient voices. A position in which the microphone 110 is arranged in the wearable device 100 will be described below.

The wearable device 100 detects the above-described voice segment and determines the recognition target with regard to voices collected by the microphone 110. At the same time, the wearable device 100 generates the reliability indicating a degree in which the acquired voice is uttered from a particular position. Further, the voice is analyzed on the basis of voice recognition technology or natural language processing technology and thereby a content uttered by the user is recognized to generate a command. The process permits the wearable device 100 to recognize an instruction content from the user and execute various processing (applications) in accordance with recognition results, for example. In addition, as other application examples, the wearable device 100 may further include a communication function and transfer the collected voices to another information processing apparatus as the other person on the phone.

Hereinafter, as an example of the transfer characteristic when the reliability generation section 124 generates the reliability, a case of using a phase difference and a case of using an acoustic characteristic will be described.

[Determination Based on Phase Difference]

Figure 5:
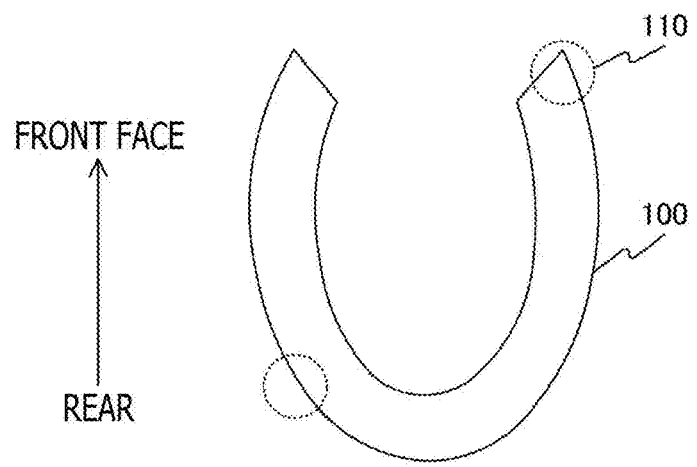
FIG. 5 is a diagram illustrating an arrangement example of microphones 110 in the wearable device 100 according to the embodiment of the present technology.
Figure 5:
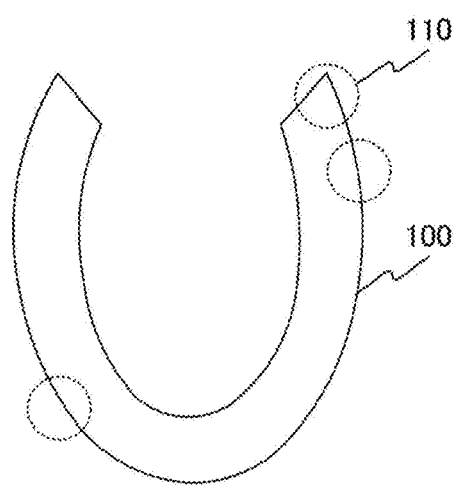
Figure 5:
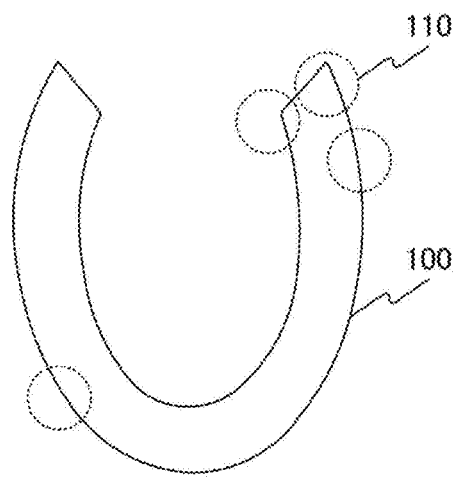

FIG. 5 is a diagram illustrating an arrangement example of the microphone 110 in the wearable device 100 according to the embodiment of the present technology. Here, in the neckband-type wearable device 100, a plurality of microphones 110 are arranged, and it is determined whether or not a voice is uttered from the wearer on the basis of a phase difference between the plurality of microphones. In a case in which the plurality of microphones 110 are arranged, a transfer path peculiar to a voice of the wearer exists for the number of the microphones 110. Accordingly, whether or not the voice is uttered from the wearer can be determined on the basis of the phase difference between the plurality of microphones.

FIG. 5 illustrates an optimum arrangement example according to the number of the microphones 110. FIG. 5a illustrates an example of two-channel microphone and further illustrates an example in which one microphone 110 is installed near (in the vicinity of) the wearer's mouth and another microphone 110 is installed in a back portion of the wearer's neck. Specifically, both the two microphones 110 are arranged in an opposed manner to each other centering on the wearer. FIG. 5b illustrates an example of a three-channel microphone and illustrates an example in which one microphone 110 is further added to FIG. 5a to be installed near the wearer's mouth. FIG. 5c illustrates an example of a four-channel microphone and illustrates an example in which one microphone 110 is further added to FIG. 5b to be installed near the wearer's mouth. Note that FIG. 5 is a diagram viewed from the wearer's head and the upper side indicates a front face of the wearer and the lower side indicates a rear of the wearer.

As illustrated in FIG. 5, as a requirement of the arrangement of the microphone 110 that is effective in identifying an utterance of the wearer in the wearable device 100, it is desirable that a number of microphones having preferable SNR (Signal to Noise Ratio) are arranged near the wearer' mouth.

Further, it is desirable that at least one microphone is positioned on the rear side of approximately 180 degrees to another microphone setting the wearer to an origin, specifically, relatively positioned point-symmetrically to an origin. More specifically, as for a signal observed by the microphone on the rear side of 180 degrees setting the neck to an origin, there is an influence on a frequency characteristic by diffraction etc., resulting in an influence even on the spatial correlation matrix representative of a spatial property of a sound source. It is considered that the above fact makes contribution to an improvement in an identification performance for a voice from a non-wearer in a particular direction.

[Determination Based on Acoustic Characteristic]

Figure 6:
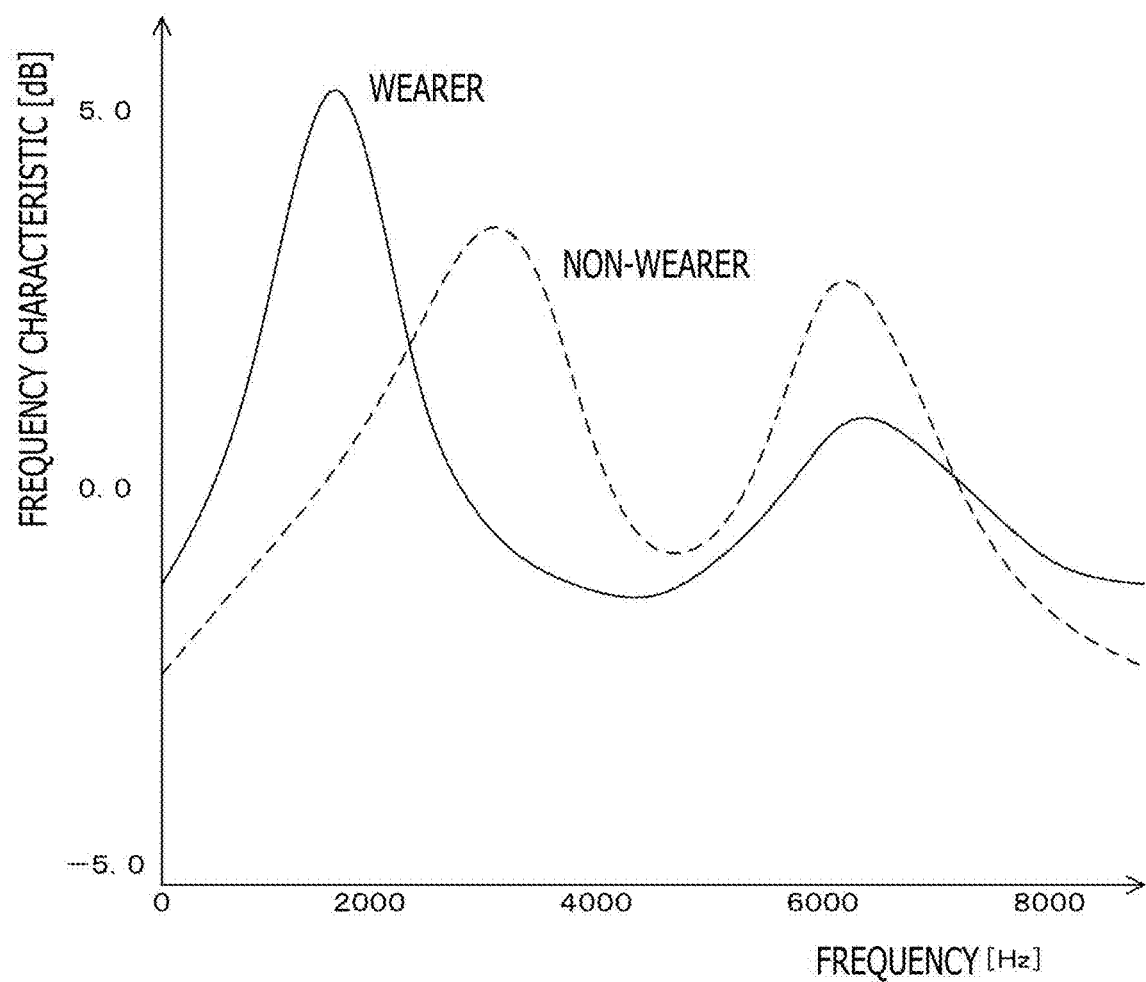
FIG. 6 is a diagram illustrating one example of an acoustic characteristic in which the wearable device 100 according to the embodiment of the present technology is assumed.

FIG. 6 is a diagram illustrating one example of the acoustic characteristic in which the wearable device 100 according to the embodiment of the present technology is assumed. Here, there is illustrated an example of the frequency characteristic in a case of installing one microphone 110 in the neckband-type neck back portion. A graph illustrated by a solid line indicates a frequency characteristic of a pronunciation by the wearer. A graph illustrated by a dotted line indicates as one example a frequency characteristic of a pronunciation by the non-wearer positioned straight in front of the wearer. Note that in values of the vertical axis, in each of the wearer and the non-wearer, normalization is performed in a more easily comparable manner such that an average value of a frequency characteristic with regard to all frequency bands is equal to zero.

Obviously from FIG. 6, both distributions of the frequency characteristic are different from each other. Accordingly, the distribution of the frequency characteristic of the acquired voice is examined and thereby it can be determined whether the voice is derived from the wearer or the non-wearer.

Note that, in the example, the neckband-type wearable device is assumed. For example, when the wearable device is an earphone-type wearable device, the transfer characteristic or the like of bone conducted sound of a microphone etc. in the ear is considered to be used.

[Reliability and Notification]

Figure 7:
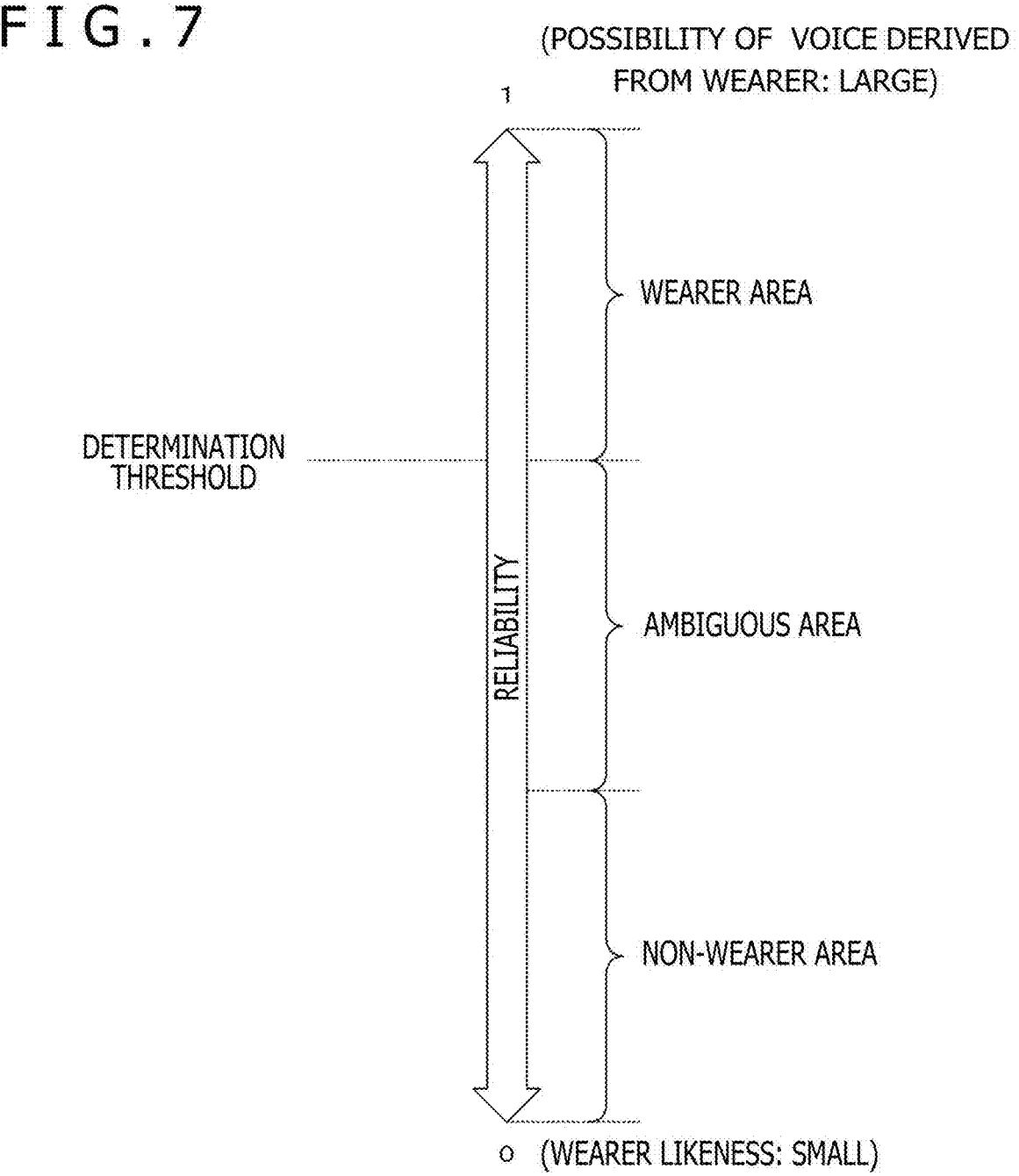
FIG. 7 is a diagram illustrating one example of reliability generated by a reliability generation section 124 according to the embodiment of the present technology.

FIG. 7 is a diagram illustrating one example of the reliability generated by the reliability generation section 124 according to the embodiment of the present technology. Here, the reliability indicates values from "0" up to "1." Further, FIG. 7 means that as the reliability is closer to "1," a possibility of the voice derived from the wearer is larger, whereas as the reliability is closer to "0," a possibility of the voice derived from the wearer is smaller.

A determination threshold is set to the reliability. If the reliability is larger than the determination threshold, the reliability falls within a wearer area and it is determined that the voice is a voice by the wearer. In the case, the voice instruction from the user can be used as a voice user interface without problems.

Figure 8:
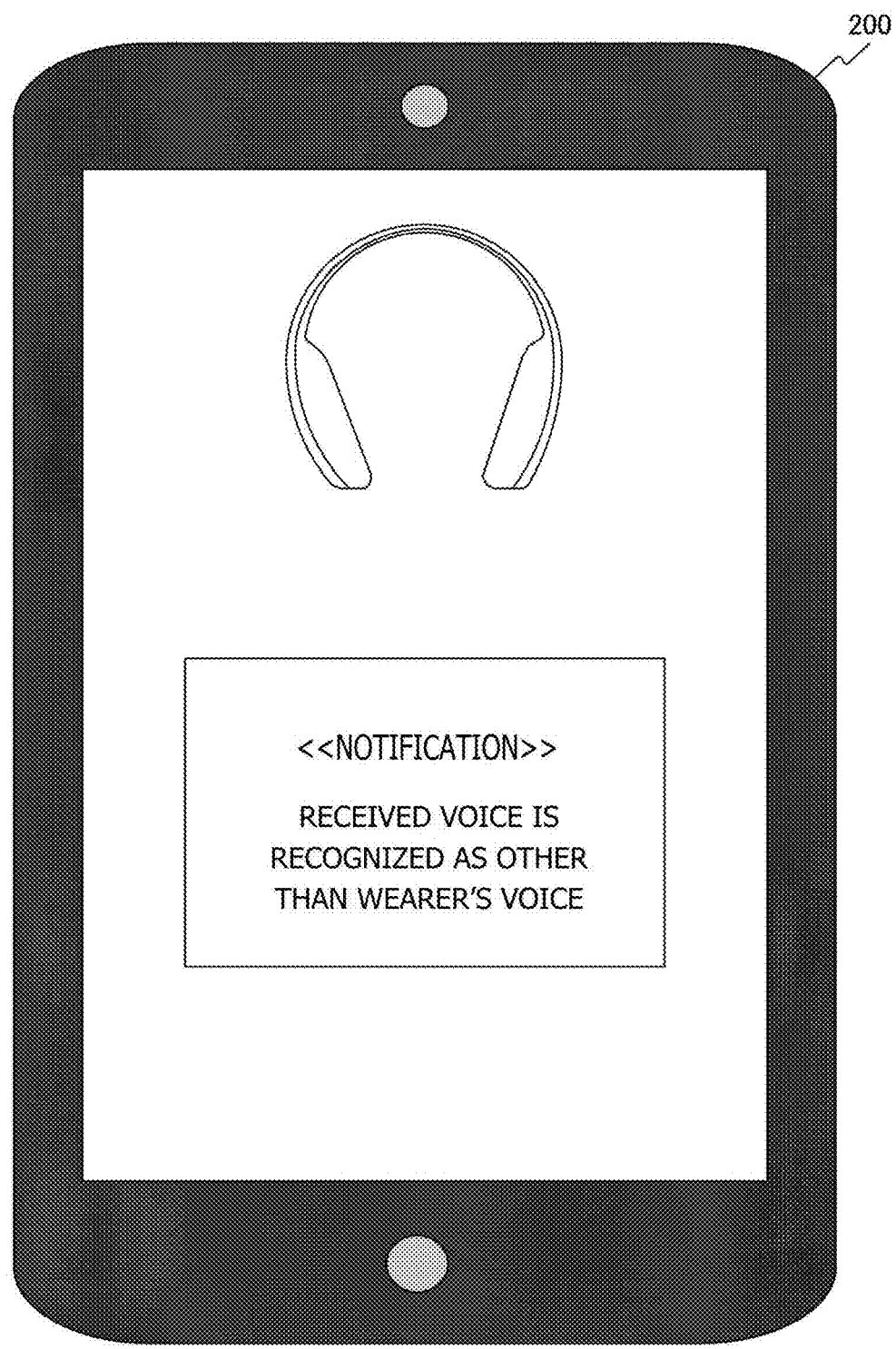
FIG. 8 is a diagram illustrating a first example of a notification in a mobile terminal 200 according to the embodiment of the present technology.

On the other hand, if the reliability is smaller than the determination threshold, it is not determined that the voice is a voice by the wearer. When the reliability is sufficiently close to "0," the reliability falls within a non-wearer area and it is determined that the voice is a voice by a person other than the wearer. At this time, as illustrated in FIG. 8, for example, it is preferably that a message "it is determined that the voice is a voice other than that of the wearer" or the like is noticed and displayed on the mobile terminal 200.

Figure 9:
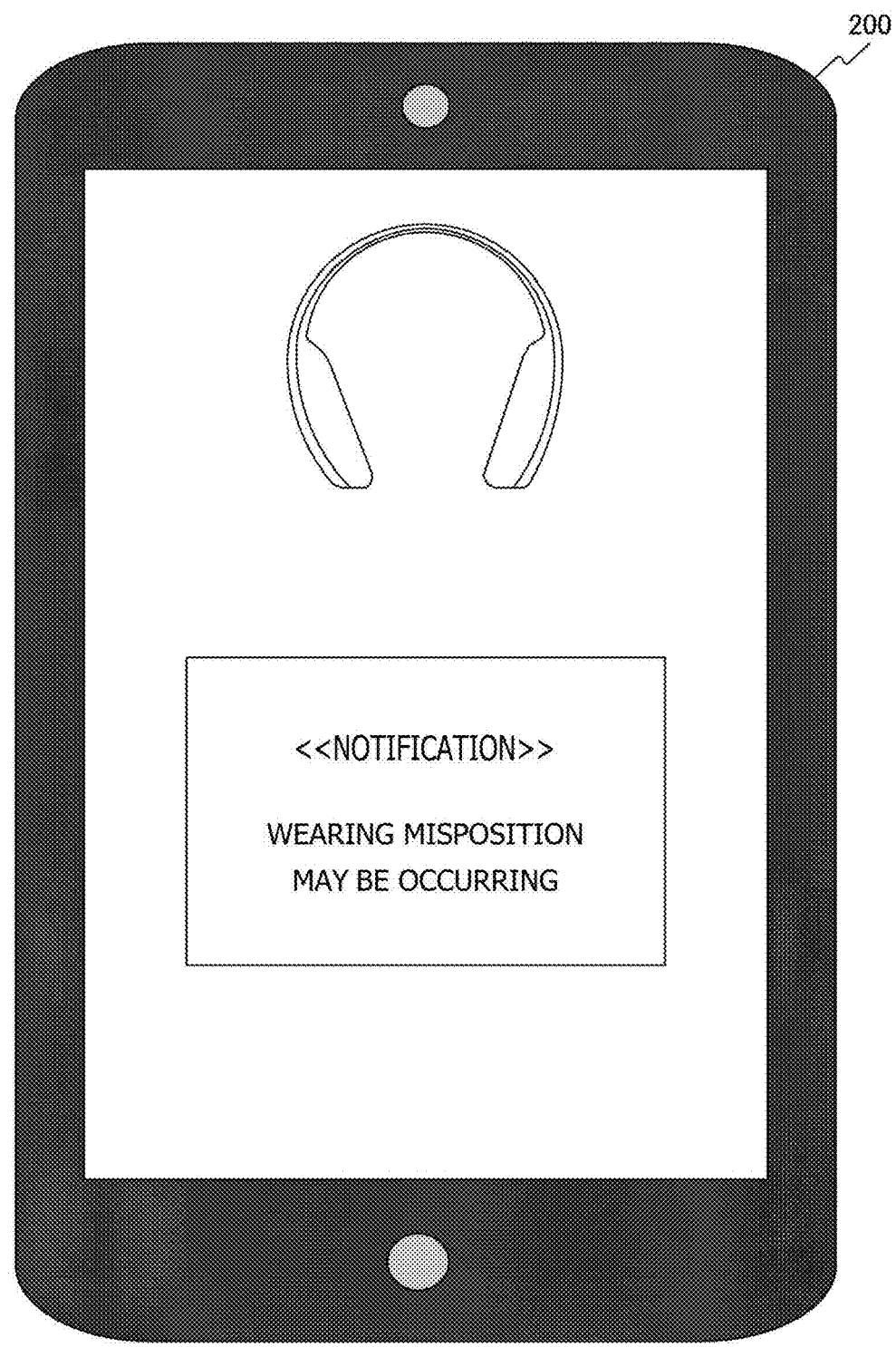
FIG. 9 is a diagram illustrating a second example of a notification in the mobile terminal 200 according to the embodiment of the present technology.
Figure 10:
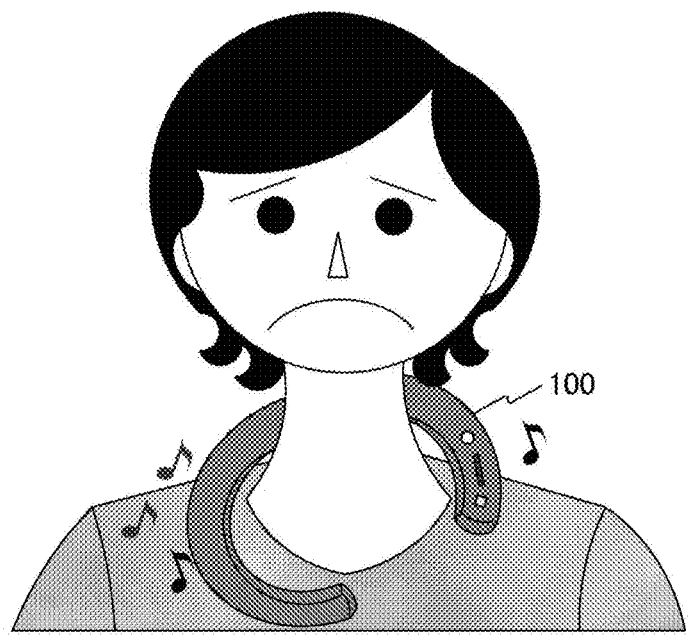
FIG. 10 is a diagram illustrating an improvement example of wearing misposition of the wearable device 100 according to the embodiment of the present technology.
Figure 10:
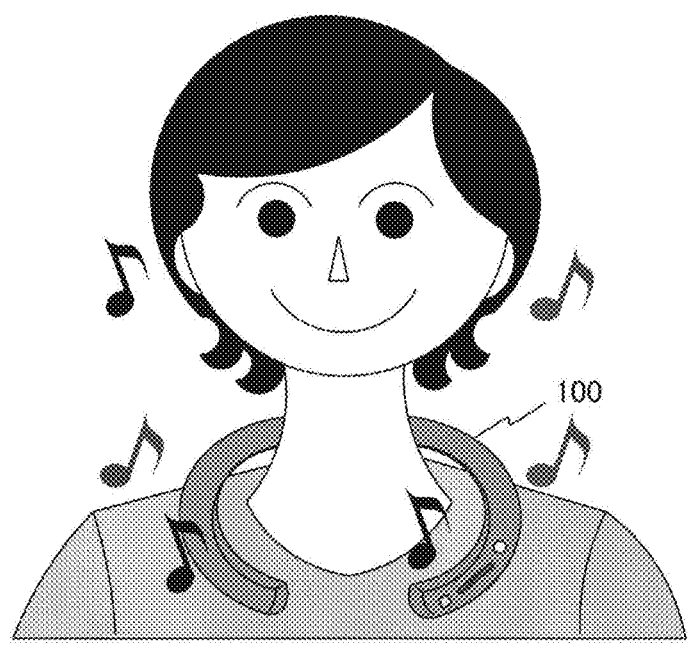

Further, an area that does not belong to any of the wearer area and the non-wearer area is set to an ambiguous area and it cannot be determined that the voice is a voice by which person. In this case, wearing of the wearable device 100 is possibly mispositioned. Therefore, as illustrated in FIG. 9, for example, it is preferably that a message "there is a possibility that the wearing misposition occurs" or the like is noticed and displayed on the mobile terminal 200. Thereby, for example, in a case in which the wearing misposition of the wearable device 100 occurs as illustrated in FIG. 10a, the user himself/herself is not initially aware of the wearing misposition in some cases. To solve the problem, when a notification that the wearing misposition is suggested is received, the user realizes the wearing misposition. Then, it is expectable that the wearable device 100 is rearranged in a right position as illustrated in FIG. 10b.

The notification for the user is performed by the above-described notification section 150. Here, as a mode of the notification, an example in which the message is displayed in the mobile terminal 200 is described, however, the mode of the notification is not limited thereto. For example, in a case in which the wearable device 100 includes a speaker that outputs voices or a vibrator that generates vibrations, a notification sound may be output from the speaker or the vibrations may be generated from the vibrator. Further, in a case in which the wearable device 100 includes a display screen, a text message may be displayed along with the notification sound or vibrations. In addition, when the message is displayed in the mobile terminal 200, it may be displayed along with the notification sound or vibrations.

Further, the number of times in which the reliability of the non-wearer area occurs may be counted and predetermined exception processing may be executed at a time point in which the above number of times surpasses a specified number of times. Note that in a case in which the reliability of the wearer area occurs on the way, the count number is considered to be initialized to zero. Further, in a case in which the reliability of the ambiguous area occurs, the status quo is considered to be held without performing initialization and counting. Note that it is preferable that the number of times until moving to the exception processing is appropriately set in accordance with conditions of the system.

Here, as predetermined exception processing, for example, it is considered that use of a sound user interface is forcibly prohibited. To release the use prohibition, a fingerprint authentication or a password input via a button, a speaker recognition, or the like is used. Further, whether or not the use of the sound user interface is prohibited may be confirmed to the user and the user may perform a response by the sound or a response by the button. Further, in a condition in which a notification is performed many times and an unpleasant sensation is given to the user, it is considered that a subsequent notification is not performed.

As described above, according to the embodiment of the present technology, the notification in the sound user interface, command processing, or the like can be executed in accordance with the reliability indicating a degree in which the acquired voice is uttered from a particular position.

Note that the embodiment described above is an example for realizing the present technology, and matters according to the embodiment have a one-to-one correspondence relationship with invention-specific matters in claims, respectively. Similarly, the invention-specific matters in claims have a one-to-one correspondence relationship with the matters according to the embodiment of the present technology, to which the same names as those of the invention-specific matters are assigned, respectively. However, the present technology is not limited to the embodiment, and may be realized by making various modifications to the embodiment within a range that does not deviate from the gist of the present technology.

The processing sequences that are described in the embodiment described above may be understood as a method having a series of sequences or may be understood as a program for causing a computer to execute the series of sequences and a recording medium storing the program. As the recording medium, a CD (Compact Disc), an MD (MiniDisc), a DVD (Digital Versatile Disc), a memory card, a Blu-ray disc (registered trademark) and the like can be used.

Note that the effects disclosed in the specification are consistently exemplary and not limitative, and thus there may be effects other than those disclosed in the specification.

Note that the present technology may have the following configurations.

(1)

An information processing apparatus including:

a voice acquisition section configured to acquire an ambient voice;

a reliability generation section configured to generate reliability indicating a degree in which the acquired voice is uttered from a particular position on the basis of a predetermined transfer characteristic; and a processing execution section configured to execute a process according to the reliability.

(2)

The information processing apparatus according to the above (1), in which the voice acquisition section includes a plurality of microphones, and the reliability generation section generates the reliability on the basis of a phase difference of the voice acquired by the plurality of microphones as the predetermined transfer characteristic.

(3)

The information processing apparatus according to the above (2), in which at least a part of the plurality of microphones are arranged in the vicinity of the particular position.

(4)

The information processing apparatus according to the above (2) or (3), in which any one pair of the plurality of microphones is arranged at the particular position in an opposed manner to each other.

(5)

The information processing apparatus according to the above (1), in which the reliability generation section generates the reliability on the basis of an acoustic characteristic of the voice acquired by the voice acquisition section as the predetermined transfer characteristic.

(6)

The information processing apparatus according to any one of the above (1) to (5), in which the processing execution section performs a notification according to the reliability.

(7)

The information processing apparatus according to the above (6), in which the processing execution section performs the notification indicating whether or not the voice is uttered from the particular position.

(8)

The information processing apparatus according to the above (6), in which the processing execution section performs the notification that it is impossible to determine whether or not the voice is uttered from the particular position.

(9)

The information processing apparatus according to the above (6), in which in a case in which the information processing apparatus is a mounting type terminal, the processing execution section performs the notification regarding a wearing condition.

(10)

The information processing apparatus according to any one of the above (1) to (9), in which in a case in which the voice is uttered from the particular position, the processing execution section executes a predetermined command.

REFERENCE SIGNS LIST

10 Sound source
20 Microphone
100 Wearable device
110 Microphone
120 Sound instruction detection section
121 Sound integration section
122 Sound segment detection section
123 Recognition target determination section
124 Reliability generation section
130 Command generation section
140 Command processing section
150 Notification section
200 Mobile terminal

The invention claimed is:

1. An information processing apparatus comprising:
a voice acquisition section configured to acquire an ambient voice, the voice acquisition section including a plurality of microphones; and
processing circuitry configured to:
generate a reliability indicating a degree to which the acquired voice is uttered from a predetermined position relative to the plurality of microphones on a basis of a predetermined transfer characteristic, wherein generating the reliability includes searching for the acquired voice only in a direction of the predetermined position relative to the plurality of microphones by performing eigenvalue decomposition only with respect to the predetermined position and generating an evaluation function in which weighted normalization according to a contribution rate of a signal subspace is performed on a spatial spectrum; and
execute a process according to the reliability.

2. The information processing apparatus according to claim 1, wherein
the processing circuitry is configured to generate the reliability on a basis of a phase difference of the voice acquired by the plurality of microphones as the predetermined transfer characteristic.

3. The information processing apparatus according to claim 2, wherein
at least a part of the plurality of microphones are arranged in a vicinity of the predetermined position.

4. The information processing apparatus according to claim 2, wherein
any one pair of the plurality of microphones is arranged at the predetermined position in an opposed manner to each other.

5. The information processing apparatus according to claim 1, wherein
the processing circuitry is configured to generate the reliability on a basis of an acoustic characteristic of the acquired voice as the predetermined transfer characteristic.

6. The information processing apparatus according to claim 1, wherein
the processing circuitry is configured to perform a notification according to the reliability.

7. The information processing apparatus according to claim 6, wherein
the processing circuitry is configured to perform the notification indicating whether or not the voice is uttered from the predetermined position.

8. The information processing apparatus according to claim 6, wherein
the processing circuitry is configured to perform the notification that it is impossible to determine whether or not the voice is uttered from the predetermined position.

9. The information processing apparatus according to claim 6, wherein
the information processing apparatus is a mounting type terminal, and the processing circuitry is configured to perform the notification regarding a wearing condition.

10. The information processing apparatus according to claim 1, wherein
the voice is uttered from the predetermined position, and the processing circuitry is configured to execute a predetermined command.

11. A method for processing a voice acquired by a plurality of microphones, the method executed by processing circuitry and comprising:
generating a reliability indicating a degree to which the acquired voice is uttered from a predetermined position relative to the plurality of microphones on a basis of a predetermined transfer characteristic, wherein generating the reliability includes searching for the acquired voice only in a direction of the predetermined position relative to the plurality of microphones by performing eigenvalue decomposition only with respect to the predetermined position and generating an evaluation function in which weighted normalization according to a contribution rate of a signal subspace is performed on a spatial spectrum; and
executing a process according to the reliability.

12. A non-transitory computer readable medium containing instructions that, when executed by processing circuitry, perform a method for processing a voice acquired by a plurality of microphones, the method comprising:
generating a reliability indicating a degree to which the acquired voice is uttered from a predetermined position relative to the plurality of microphones on a basis of a predetermined transfer characteristic, wherein generating the reliability includes searching for the acquired voice only in a direction of the predetermined position relative to the plurality of microphones by performing eigenvalue decomposition only with respect to the predetermined position and generating an evaluation function in which weighted normalization according to a contribution rate of a signal subspace is performed on a spatial spectrum; and
executing a process according to the reliability.

* * * * *